United States Patent [19]

Curnutt

[11] 4,210,369

[45] Jul. 1, 1980

[54] ANTI-LOCK POWER BRAKE

[76] Inventor: Charles R. Curnutt, 75922 Baseline, 29 Palms, Calif. 92277

[21] Appl. No.: 968,276

[22] Filed: Dec. 11, 1978

[51] Int. Cl.² ............................................. B60T 8/087
[52] U.S. Cl. ..................................... 303/116; 303/10
[58] Field of Search ...................... 188/291, 293, 294; 303/10, 11, 24 A, 24 R, 24 BB, 116

[56] References Cited

U.S. PATENT DOCUMENTS

| | | | |
|---|---|---|---|
| 3,743,363 | 7/1973 | Hodge et al. | 303/116 |
| 3,801,161 | 4/1974 | Sharp | 303/116 X |

*Primary Examiner*—Duane A. Reger
*Attorney, Agent, or Firm*—Ralph B. Pastoriza

[57] ABSTRACT

Controlled braking of a vehicle wheel is provided by inserting between the normal hydraulic pressure applied by the brake pedal and the brake drum or brake disc an hydraulic control system comprising a rotatable clutch and hydraulic pump together with a bypass valve. The arrangement is such that application of braking action on the foot pedal urges the clutch into engagement with the wheel disc or drum so that the clutch will rotate with the disc or drum. The hydraulic pump in turn is coupled to the clutch to rotate with the clutch and provide output hydraulic pressure proportional to the speed of rotation of the clutch. The outlet and inlet of the pump are connected to a bypass valve so that recirculation can take place. A further hydraulic line from the pump outlet connects to the normal friction means hydraulically controlled for engaging the disc or drum to brake the wheel. With this arrangement, when the brakes are initially applied, high hydraulic pressure will be applied to the wheel disc or drum because of the relatively high RPM of the pump. As the wheel slows, the RPM of the pump also decreases, thereby decreasing the hydraulic pressure applied to the friction means engaging the wheel disc or drum.

4 Claims, 3 Drawing Figures

ANTI-LOCK POWER BRAKE

This invention relates generally to braking systems for vehicles and more particularly to an anti-lock power brake arrangement for use with either drum or disc-type vehicle wheel brakes.

BACKGROUND OF THE INVENTION

Conventional automobile braking systems normally operate by applying fluid pressure to a friction means which engages either a wheel disc or wheel drum to effect the braking action. The applied hydraulic pressure is directly under control of the brake pedal although a fluid pressure amplifying system as in the case of power brakes may be provided. As the brake pedal is applied, constant or increasing hydraulic pressure is applied to the friction means to thereby "grip" the wheel disc or drum. Such sudden "gripping" by the friction means can result in a "locking" condition; that is, rotation of the wheel is stopped completely resulting, more often than not, in dangerous skidding. Slower braking action can be applied to permit the wheel to still rotate and yet be slowed by friction of the friction means, but such is not possible in an emergency situation where rapid stopping of the vehicle is necessary.

The foregoing condition is avoided by "pumping" the brakes; that is, periodically releasing the brake pressure to decrease the hydraulic fluid pressure on the friction engaging means so that a series of gripping action results to slow the wheel.

While the foregoing "brake pumping operation" can effectively slow the vehicle in a controlled manner by skilled drivers, a driver under hazardous circumstances may panic and simply jam the brake pedal to the floor and hold it in such condition. A need accordingly exists to provide some mechanism for overcoming such conditions; that is, some type of automatically controlled braking system which will operate without the necessity of a driver "pumping the brakes". Such systems might have particular advantage in racing cars.

BRIEF DESCRIPTION OF THE PRESENT INVENTION

Bearing the foregoing considerations in mind, the present invention contemplates the provision of a controlled braking system which essentially operates to slow a car without any need for the operator to "pump" the brake pedal.

Briefly, this controlled braking is provided by hydraulic pressure applied to a friction means engaging a member rotatable with the wheel such as a disc or drum. However, rather than having the hydraulically responsive friction means connected directly for operation by the brake pedal, there is provided a clutch means responsive to application of the brake pedal to be rotated with the disc or drum. A pump provides hydraulic pressure to the friction means and is connected for rotation by the clutch means so that the pressure increases with increasing RPM of the clutch means and decreases with decreasing RPM of the clutch means. A bypass valve connects between the outlet and inlet of the pump so that there exists fluid recirculation at the hydraulic pressure determined by the RPM of the pump. A line from the outlet of the pump applies this hydraulic pressure to the friction means.

With the foregoing arrangement, the decreasing RPM of the wheel as a result of application of the friction means decreases the pump RPM by way of the clutch means. This decrease in the pump RPM decreases automatically the hydraulic pressure applied to the friction means to that "locking" of the friction means is avoided and a controlled deceleration of the vehicle results.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
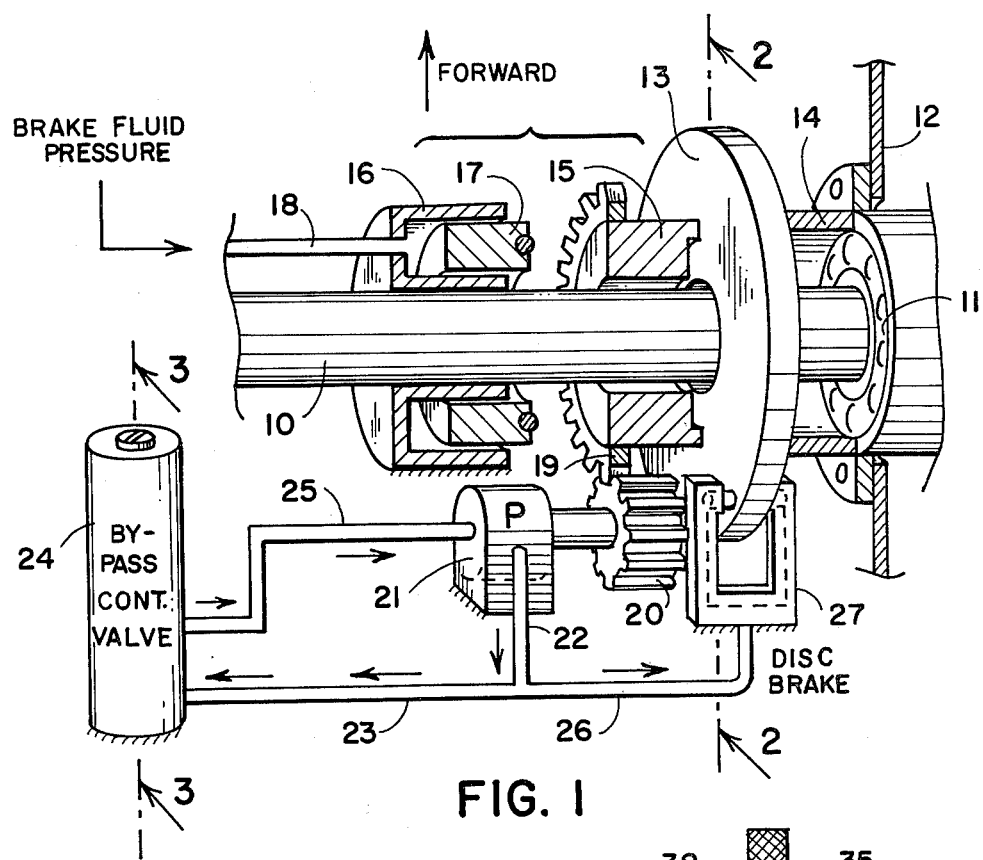
FIG. 1 is a broken away perspective view partly in cross section of the basic components making up the anti-lock power brake of this invention.

Referring first to FIG. 1, there is shown a portion 10 of a vehicle wheel axle supporting through appropriate bearings 11 a vehicle wheel, a fragmentary portion of which is shown at 12. A disc type brake schematically indicated at 13 is secured for rotation with the wheel 12 as indicated at 14. While a disc type brake is illustrated, a brake drum could equally as well be shown.

In accord with this invention, there is provided a clutch member 15 mounted for free rotation about the axle 10 but so arranged as to be axially movable into engagement with the face of the disc 13 so as to rotate therewith.

Such axial movement of the clutch member 15 is effected in response to application of the brake pedal and in the particular embodiment disclosed, there is provided a cylinder 16 incorporating an annular piston 17 for this purpose. Hydraulic fluid responsive to application of brake pedal is applied through a line 18 to urge the piston 17 outwardly or to the right as viewed in FIG. 1.

The cylinder 16 and annular piston 17 are shown exploded away from the clutch member 15 for ease of illustration. However, it will be understood that the piston 17 engages the face of the clutch member 15 so that when hydraulic fluid pressure is applied by line 18, the clutch member 15 will be urged into frictional engagement with the face of the disc 13. Appropriate roller bearings may be provided so that the clutch member 15 can rotate with the disc 13 while the annular piston 17 remains stationary.

Clutch member 15 as shown in FIG. 1 incldes a ring gear 19 secured for rotation therewith in turn coupled to a gear 20. Gear 20 in turn drives a positive displacement fluid pump 21 also designated by the letter P. The RPM or speed of rotation of the pump 21 is directly controlled by the speed of rotation of the clutch member 15 which in turn depends upon the speed of the disc 13 and the pressure exerting the clutch member against the face of the disc.

Pump 21 has a fluid outlet line 22 passing through line 23 to a bypass valve 24. Fluid from the bypass valve passes along a line 25 to the inlet of the pump 21 so that fluid is circulated by the pump through the bypass valve 24.

In addition to the foregoing, there is provided a further hydraulic line 26 connected to the outlet line 22 of the pump. This additional hydraulic line 26 applies the pressure of the recirculating hydraulic fluid directly to a friction means 27 associated with the brake disc 13 so that application of hydraulic pressure on line 26 causes a frictional engagement of the disc 13 by the friction means 27.

Figure 2:
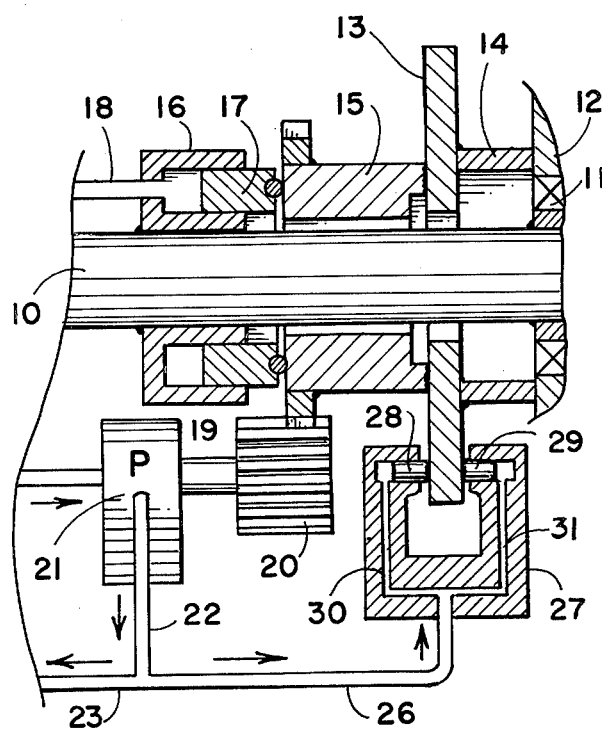
FIg. 2 is a fragmentary cross section taken in the direction of the arrows 2—2 of FIG. 1.

Referring particularly to the cross section of FIG. 2, the various components corresponding to those described in FIG. 1 are indicated by the same numerals and it will be noted that the clutch member 15 has been urged into frictional engagement with the disc 13 by the annular piston 17.

Also illustrated in FIG. 2 are further details making up the friction means 27. Thus, as shown, there are provided small pistons 28 and 29 arranged to be hydraulically urged into frictional engagement with opposite sides of a peripheral portion of the brake disc 13 upon application of fluid pressure. This fluid pressure is applied to the pistons 28 and 29 by way of fluid passages 30 and 31 both connecting to the additional hydraulic line 26 from the pump outlet 22.

Figure 3:
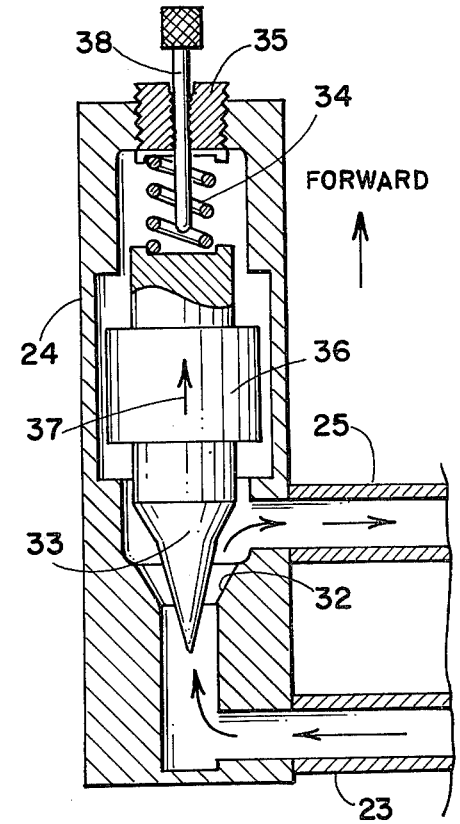
FIG. 3 is a fragmentary view partly in cross section and partly broken away taken in the direction of the arrows 3—3 of FIG. 1.

FIG. 3 illustrates the bypass control valve in greater detail wherein a fairly sophisticated version of this valve is illustrated. More particularly, in certain simplified versions of the present invention, the bypass control valve need only be provided with a bypass orifice initially designed with a fixed orifice sized to provide for sufficient recirculation that the desired controlled pressure action on the friction means 27 will obtain. In the structure illustrated in FIG 3, however, the bypass control valve 24 includes a variable orifice structure defined by a sloping valve seat 32 cooperating with a tapered pin 33. Fluid from the outlet of the pump on line 23 enters the lower portion of the bypass valve 24 as indicated by the arrows to pass through the variable orifice defined between the sloping seat 32 and tapered pin 33 to pass back to the inlet of the pump by way of line 25.

Variation in the size of the orifice is accomplished by moving the tapered pin 33 further into the orifice to decrease its size or further out of the orifice to increase its size. Towards this end, the pin is mounted for axial movement as illustrated and there is provided a spring 34 whose biasing force on the pin 33 can be adjusted as by a threaded member 35.

With fluid flowing through the valve as indicated by the arrows in FIG. 3, the fluid pressure will tend to hold the tapered pin slightly raised from the seat, this force being countered by the spring 34 so that an equilibrium position will be reached for a given fluid pressure. If this fluid pressure increases, then the orifice will effectively become larger in size as a result of upward movement of the tapered pin 33 as viewed in FIG. 3. Such upward movement will permit greater circulation which in turn will effectively result in a decreased pressure.

Similarly, should the fluid pressure decrease, the spring 34 will tend to urge the tapered pin 33 further into the orifice to decrease its size. This decrease in orifice size will decrease the rate of fluid circulation which thus necessarily results in an increase in the fluid pressure.

From the foregoing, it will be evident that the bypass valve with the spring 34 is self-adjusting in accord with the applied fluid pressure.

In addition, and in accord with a feature of this invention, the orifice size can be made responsive to inertia and towards this end, there is provided a mass 36 affixed to the pin as shown.

Moreover, the bypass valve is so oriented that the axial movement of the pin is in the direction of movement of the vehicle, movement of the pin out of the orifice being in the forward direction of such vehicle movement. The direction of vehicle movement is indicated by the arrow and the lettering "FORWARD" in both FIGS. 1 and 3.

OPERATION

In describing the operation of this invention, reference is had to both FIGS. 1 and 2. Assume that the vehicle is travelling at a high rate of speed so that the wheel 12 and disc 13 are rotating at relatively high RPM. When an operator applies the brake pedal, brake fluid pressure will act against the annular piston 17 by way of the fluid line 18 to urge the piston 17 against the clutch member 15 and force it into frictional engagement with the disc 13. The clutch member 15 will rapidly reach the same rotational rate as the disc 13 simultaneously driving the pump 21 by way of the gears 19 and 20 at this high rate of speed.

The hydraulic fluid pressure in the recirculating pump lines 23 and 25 is proportional to the RPM of the pump, this pump constituting a positive displacement type pump. Thus, this high pressure resulting from high RPM is applied by the line 26 to the friction means 27 to exert a fairly large frictional pressure against the disc 13 all as described in connection with FIG. 2.

The application of friction on the disc 13 by the friction means 27 will immediately start slowing the vehicle and the slower rotational speed of the disc 13 is imparted to the clutch 15 and thus to the pump 21 by way of the gears. With lower RPM operation of the pump, the hydraulic pressure will correspondingly decrease in the line 26 so that the initial large frictional engagement of the disc 13 by the friction means 27 will decrease thereby avoiding any "locking".

From the foregoing, and assuming for the moment that the orifice of the bypass valve remains of constant size, it will be clear that a controlled braking of the vehicle automatically takes place as a consequence of the fluid pressure feedback arrangement by way of the clutch member 15 and pump 21. In other words, if the orifice size of the bypass valve remains fixed, the applied friction to the disc will decrease with decreasing rotational speed of the disc and thereby apply a smooth deceleration to the vehicle without the necessity of any "brake pumping".

Considering now the operation with the specific bypass valve illustrated and described in FIG. 3, the initial decrease in fluid pressure as a consequence of initial engagement of the disc 13 by the friction means 27 not only reduces the pressure as a consequence of the decreased RPM of the pump 21 but this decreased pressure results in the tapered pin 33 moving further into the orifice by the spring 34 thereby decreasing the orifice size. Decrease in the orifice size of the bypass valve inhibits recirculation by the pump so that the pressure of the fluid is again increased even though the pump RPM is lowered. This increased pressure is applied to the friction means 27 to more tightly engage the disc 13 and cause a more rapid deceleration of the disc 13. With the further deceleration of the disc 13, the pump 21 is similarly slowed to again result in a decrease in the hydraulic fluid pressure which again is reflected by movement of the tapered pin 33 further into the orifice in the bypass valve to result in an increased pressure which is applied to the friction means 27.

The result of the foregoing is an automatic "brake pumping" action wholly independent of the operator's application of braking pressure to the braking pedal. In other words, the rapid change in fluid pressure as a result of the variable orifice bypass valve provides the desired "pumping" action on the friction means 27 to provide for a controlled slowing of the vehicle.

The addition of the inertia means in the form of the mass 36 to the tapered pin 33 further augments the above described action. Thus, if the vehicle is rapidly slowed in a forward direction the deceleration results in an outward movement of the pin 33 or upward movement as viewed in FIG. 3. This movement results from the fact that the inertial mass 36 will tend to maintain its original velocity while the remaining valve structure surrounding the mass slows with the vehicle. The extent of motion imparted by the inertia can be controlled by adjustment of the spring 34 opposing the inertial motion in response to deceleration.

Thus, assume an initial rapid deceleration takes place, the mass 36 will tend to remain in its previous position with the result that the tapered pin 33 will be moved further out of the orifice thereby permitting increased circulation and dropping the pressure of the hydraulic fluid in addition to the normal drop of pressure resulting from decreased RPM of the pump. The sudden decrease in fluid pressure will permit the friction means 27 to essentially release the disc 13 wherein immediately the deceleration stops so that the spring 34 will return the taper pin 33 further into the orifice thereby rapidly inhibiting recirculation and resulting in a rapid increase in the pressure. This rapid increase then operates the friction means to engage tightly the disc 13 and the heretofore described "pumping" is augmented by the provision of the inertial mass. An adjustable "stop" 38 is provided as shown in FIG. 3 to limit movement of the inertial mass 36 and thus limit the maximum extent that the valve will open. Adjustment of the member 35 to a given position will adjust the force exerted by spring 34 to result in smooth and uniform deceleration of the vehicle to full stop after reaching a given low speed.

The provision of the inertial mass would find its most appropriate application in racing cars wherein controlled braking within seconds is essential. However, it may also be incorporated in conventional vehicles.

From all of the foregoing, it will be apparent that the present invention has fulfilled a long-felt need for some type of anti-lock power brake which will effect proper controlled braking of a vehicle without having to rely on an operator "pumping" the foot brake.

I claim:

1. An anti-lock power brake for providing controlled braking of a vehicle wheel, including, in combination:
   (a) a disc rotatable with said wheel;
   (b) a freely rotatably mounted clutch member coaxial with said disc such that said clutch member rotates with said disc when axially urged into engagement therewith;
   (c) means responsive to application of the brake pedal of said vehicle to urge said clutch member into engagement with said disc;
   (d) a positive displacement fluid pump coupled to said clutch member so that rotation of said clutch member operates said pump to provide fluid pressure proportional to the speed of rotation of said clutch member;
   (e) a bypass valve connected between the output and input lines of said pump so that fluid circulates through said bypass valve at said pressure said bypass valve having a variable sized orifice responsive to said fluid pressure of the fluid circulating therethrough so that an increase of pressure increases the size of the orifice to thereby reduce said pressure and a decrease in said pressure decreases the size of the orifice to thereby increase said pressure, said variable sized orifice further being responsive to inertia resulting from movement of the vehicle such that sudden deceleration of the vehicle results in a momentary increase in the size of the orifice; and
   (f) friction means connected to the output line of said pump and responsive to said fluid pressure to apply friction on said disc proportional to said pressure whereby when the brake pedal is operating, said clutch member is rotated by said disc to exert hydraulic pressure by way of said pump to said friction means thereby slowing the rotation of said disc, the decreased rotation of said disc resulting in a lower pump speed to reduce said hydraulic pressure and thereby the friction applied to said disc by said friction means so that an automatically controlled braking action takes place.

2. A brake according to claim 1, in which said means responsive to application of said brake pedal comprises an hydraulic cylinder and piston arrangement wherein movement of said piston in response to hydraulic pressure from movement of the brake urges said clutch member against said disc.

3. A brake according to claim 1, in which said variable sized orifice is defined by a valve seat of sloping sides, and a tapered pin mounted for axial movement into the orifice to decrease its size and out from the orifice to increase its size; spring means biasing said pin into said orifice; and a mass secured to said pin, the axis of the pin being in alignment with the direction of motion of said vehicle and movement of the pin out of said orifice being in the forward direction of motion of the vehicle so that said mass provides said inertia.

4. A brake according to claim 3, including means for adjusting the biasing force applied by said spring on said pin; and adjustable stop means for limiting the movement of said mass in said forward direction to a given position.

* * * * *